L. E. WHITON.
CHUCK.
APPLICATION FILED SEPT. 28, 1907.
1,037,385.
Patented Sept. 3, 1912.
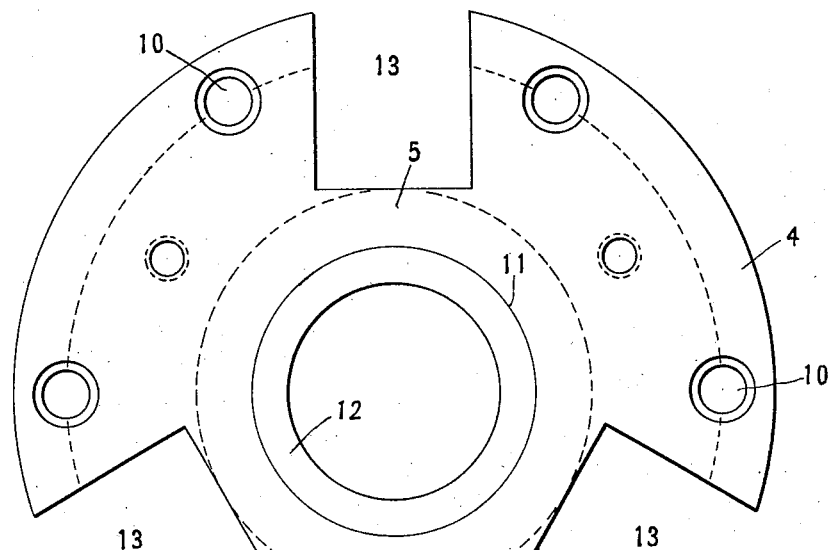
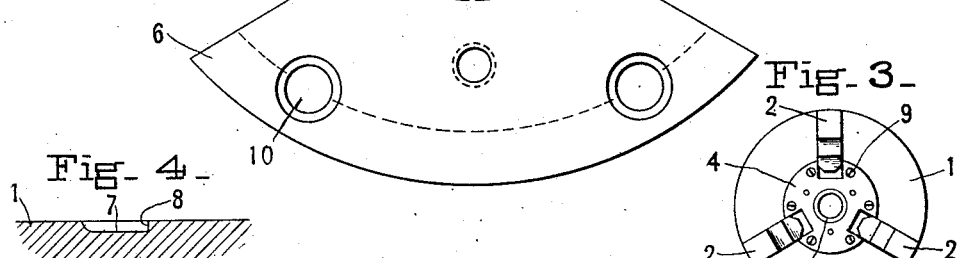
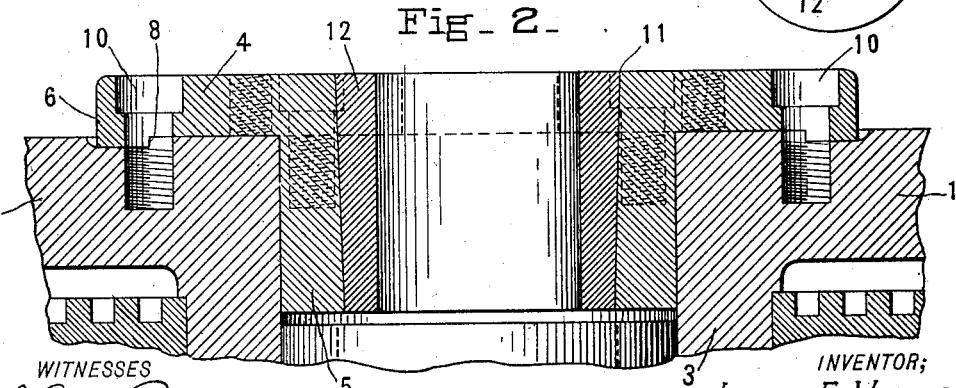
WITNESSES
INVENTOR;
LUCIUS E. WHITON.
ATTORNEY

UNITED STATES PATENT OFFICE.

LUCIUS E. WHITON, OF NEW LONDON, CONNECTICUT.

CHUCK.

1,037,385.   Specification of Letters Patent.   Patented Sept. 3, 1912.

Application filed September 28, 1907. Serial No. 394,957.

*To all whom it may concern:*

Be it known that I, LUCIUS E. WHITON, a citizen of the United States, residing at New London, in the county of New London and State of Connecticut, have invented certain new and useful Improvements in Chucks, of which the following is a specification.

My invention relates to improvements in chucks.

In some instances it is desirable to steady the cutting tool. This is sometimes accomplished by a centering bar carried by or with the tool and which fits into and has a bearing in a bushing at the center of the chuck. In work of this character it is customary to drive the bushing into a central hole in the body of the chuck, but on account of distortion of the chuck body under strain, the bushing often works loose and the tool thus becomes unsteady.

It is my object to prevent this and to render the chuck more reliable. For this purpose a special reinforcing and supporting member is provided, which is secured to the chuck and in which the bushing fits.

Figure 1, is a front view of such a member. Fig. 2, is a cross sectional view of a fragment of a chuck with my invention. Fig. 3, is a front view on a small scale of a chuck embodying my invention. Fig. 4, is a fragmentary detail view showing a section of the chuck body.

The chuck body 1, carries a plurality of jaws such as 2, 2, 2. These are adjustable in any suitable manner in grooves or ways as is customary. The grooving of the body of the chuck for the jaws weakens it somewhat and renders the body liable to distortion. The hub 3, is part of the chuck body.

The special member consists of a plate 4 and hub 5. The hub 5, fits inside the hub 3 of the chuck, while the plate 4 fits the face of the chuck and has a peripheral flange 6, which fits into a recess 7 in the face of the chuck, the inner surfaces of the flange fitting snugly against the shoulder 8 of the recess. This member is secured to the chuck body in a suitable manner, for instance, by a series of screws, such as 9, which pass through holes such as 10 into the chuck body. The member has a tapered recess or opening 11, into which the bushing 12 fits. This bushing serves as a bearing for the centering bar. When the chuck jaws 2, 2, are adjustable to the center, it is necessary to cut out portions of the plate 4, as at 13, 13, 13, to allow for their movements.

The special member is made substantially inflexible and of sufficient size to securely grip the chuck and prevent any distortion when in use or during adjustment of the jaws. The plate portion 4 is of a relatively rather limited diameter. The plate then holds the center of the chuck between the flange 6 and hub 5, so that practically no distortion of the chuck body takes place. In any event the hub 5 is absolutely rigid so that there is no tendency of the bushing 12 to work loose. The bushing is carried directly by the special member and only indirectly by the chuck body.

What I claim is:

1. A chuck construction, comprising a body having an opening and adjustable jaws carried by the body and a special member secured to the face of said body and provided with a rigid non-distortable bushing bearing fitting in said opening.

2. A chuck construction, comprising a body having a central hub, jaws adjustable in said body and a reinforcing plate secured between said jaws and having a central hub for a bushing, located in the body hub.

3. A chuck construction comprising a body having a central opening and a surface recess in combination with a reinforcing plate having a hub fitting in said opening and a flange seated in said recess and screws passing through the plate and flange for holding said plate and hub to said body.

4. A chuck construction, comprising a body having a central opening and a surface recess in combination with a plate secured to said body and having a flange in said recess and a hub in said opening.

5. In a chuck construction, a body having a central opening and jaw guiding ways leading therefrom, an inflexible bushing secured in said opening and a tapered centering bushing frictionally fitted in said inflexible bushing.

6. As an article of manufacture, a chuck attachment, comprising a hub portion adapted to fit within the central opening of a chuck body and itself having a central tapered passage to receive a centering bushing, a plate portion adapted to fit the face of a chuck around the central opening, a shouldered flange carried by the outer edge of said plate portion for fitting in a groove of the chuck body and means for securing the plate portion to the chuck body.

7. As an article of manufacture, a chuck attachment comprising a rigid hub portion having a passage to receive a bushing, a plate portion rigid with said hub portion and a flange concentric with the hub portion and extending backwardly around the hub and having passages for screws through said flange.

8. A chuck comprising a body having a central opening and ways leading therefrom, jaws guided in said ways and a reinforcing device comprising a rigid hub fitted in the central opening and rigid segmental portions extending from the outer end of said hub and secured to the face of the chuck body between the jaw ways.

9. In a chuck, a body having a central opening and radial ways leading therefrom, a reinforcing member having a hub fitted in said opening and rigid segmental plate portions extending out therefrom between the ways, jaws operable in said ways between said segmental plate portions and means for securing said plate portions to the face of said chuck body.

10. In a chuck, a body having a central opening and radial ways leading therefrom and grooves in the face of the body between the ways, a reinforcing member having a hub fitted in said opening and rigid segmental plate portions extending out therefrom between the ways and having flanges seated in the grooves of the body, jaws operable in said ways between said segmental plate portions and means for securing said plate portions to the face of said body.

11. In a chuck, a body having a central opening and radial ways leading therefrom, a reinforcing member having a hub fitted in said opening and rigid segmental plate portions extending out therefrom between the ways, jaws operable in said ways between said segmental plate portions and screws passing through the plate portions for securing said plate portions to the face of said body.

12. As an article of manufacture, a chuck reinforcing attachment, comprising a rigid hub having a central opening and adapted to fit within the opening in a chuck body, rigid plate segments at one end of said hub spaced apart from each other and means for securing said plate segments to the face of a chuck body.

13. As an article of manufacture, a chuck reinforcing attachment, comprising a hub having a central opening and adapted to fit within the opening in a chuck body, rigid plate segments at one end of said hub spaced apart from each other and having backwardly projecting shouldered flanges for engagement with the walls of a groove in the chuck body.

14. In a chuck construction, a body having a central opening and jaw guiding ways leading therefrom, an inflexible bushing fitted tight in said opening and having a rigid flange secured to the face of the body and a tapered centering bushing frictionally fitted in said inflexible bushing.

In testimony whereof I affix my signature in presence of two witnesses.

LUCIUS E. WHITON.

Witnesses:
L. G. STEBBINS,
J. H. GUMBLE.

---

Copies of this patent may be obtained for five cents each, by addressing the "Commissioner of Patents, Washington, D. C."